United States Patent [19]

Markley

[11] Patent Number: 4,531,543
[45] Date of Patent: Jul. 30, 1985

[54] UNI-DIRECTIONAL FLOW, FLUID VALVE

[75] Inventor: George L. Markley, Montour Falls, N.Y.

[73] Assignee: Ingersoll-Rand Company, Woodcliff Lake, N.J.

[21] Appl. No.: 671,811

[22] Filed: Nov. 15, 1984

Related U.S. Application Data

[63] Continuation of Ser. No. 506,017, Jun. 20, 1983, abandoned.

[51] Int. Cl.³ .............................................. F16K 15/02
[52] U.S. Cl. ............................... 137/515.7; 137/513.3; 137/516.15; 137/516.25; 137/528; 137/533; 137/533.19
[58] Field of Search ................... 137/516.15, 528, 533, 137/533.17, 533.19, 515.7, 513.3, 516.25

[56] References Cited

U.S. PATENT DOCUMENTS

| | | | |
|---|---|---|---|
| 966,390 | 8/1910 | Elder | 137/515.7 X |
| 1,359,006 | 11/1920 | Wardwell | 137/516.15 |
| 2,350,215 | 5/1944 | Christensen | 137/DIG. 528 X |
| 2,391,211 | 12/1945 | White | 137/513.3 X |
| 2,676,613 | 4/1954 | Baxter | 137/516.25 X |
| 3,176,712 | 4/1965 | Ramsden | 137/516.15 X |
| 3,534,767 | 10/1970 | Swinney | 137/515.7 X |
| 3,913,322 | 10/1975 | Over | 137/513.3 X |

FOREIGN PATENT DOCUMENTS

| | | |
|---|---|---|
| 802604 | 2/1951 | Fed. Rep. of Germany ...................... 137/516.15 |
| 1001071 | 1/1957 | Fed. Rep. of Germany ... 137/515.7 |

Primary Examiner—Robert G. Nilson
Attorney, Agent, or Firm—Bernard J. Murphy

[57] ABSTRACT

The valve has a seat and plate coupled together to define a shallow chamber therebetween, and a thin, metal, valving disc is freely movable, through the chamber, between the seat and plate. The disc has a metering orifice in the center thereof for communicating with a registering larger, central orifice in the plate. The seat has four orifices, circumscribing the center of the seat, for addressing "unseating" fluid pressure to the disc.

8 Claims, 3 Drawing Figures

UNI-DIRECTIONAL FLOW, FLUID VALVE

This application is a continuation of application Ser. No. 506,017, filed June 20, 1983, now abandoned.

This invention pertains to check valves, or uni-directional flow, fluid valves, and in particular to such valves useful for admitting fuel into a pre-combustion chamber of a gas-fired, spark-ignited, reciprocating engine. In such an aforesaid application, a uni-directional flow, fluid valve replaces a fuel injection valve and utilizes a pressure differential obtaining between the power cylinder and the pre-combustion chamber fuel manifold of the engine to meter and control the fuel injection and the timing thereof.

Commercial check valves, or uni-directional flow, fluid valves, known in the prior art are not acceptable, for the stated application, for one or more of the following reasons. The valving action thereof is not fast enough. The pressure differential necessary to operate such prior art valves is too high. The known check valves, or uni-directional flow, fluid valves are susceptible to sticking because of moisture or other liquids, and they cannot both withstand extremely elevated temperatures and provide a positive seal simultaneously.

It is an object of this invention to set forth a novel, uni-directional flow, fluid valve which hasn't the aforestated disadvantages of the prior art valves of the same type. Such inventive object, particularly, is to disclose a new, uni-directional flow, fluid valve which exhibits a rapid, responsive action, provides sure sealing even in the presence of greatly elevated temperatures, and is virtually immune to sticking in spite of moisture.

Specifically, it is an object of this invention to set forth a uni-directional flow, fluid valve, comprising first means defining a valve seat; second means defining a valve plate; and third means holding said seat and said plate in a mutually confronting relationship; wherein said seat and said plate have means which cooperatively define a cylindrical chamber therebetween; and a valving element, confined in said chamber, and freely movable between first and second positionings therewithin; wherein said seat, plate and said element are orificed to accommodate fluid flow, sequentially, through one of said first and second means, through said element, and through the other of said first and second means; said seat, plate and said element have means cooperative (a) to prohibit such aforesaid sequential fluid flow therethrough, upon said element being in one of said first and second positionings, and (b) to permit and meter such fluid flow therethrough, upon said element being in the other of said first and second positionings; and said element and one of said first and second means have orifices formed therein, as aforesaid, which are always in substantially common, coaxial alignment or registry, always to accommodate fluid flow therebetween; wherein said element comprises means responsive to fluid pressure addressed thereto (a) through one of said first and second means, for moving said element from one of said first and second positionings to the other thereof, and (b) through the other of said first and second means, for moving said element from the other of said first and second positionings to said one positioning; and the other of said first and second means has orifices formed therein, as aforesaid, which are always out of registry with any orifice in said element.

Further objects of this invention, as well as the novel features thereof, will become more apparent by reference to the following description, taken in conjunction with the accompanying figures.

FIGS. 1 and 2 are of substantially the same scale.

Figure 1:
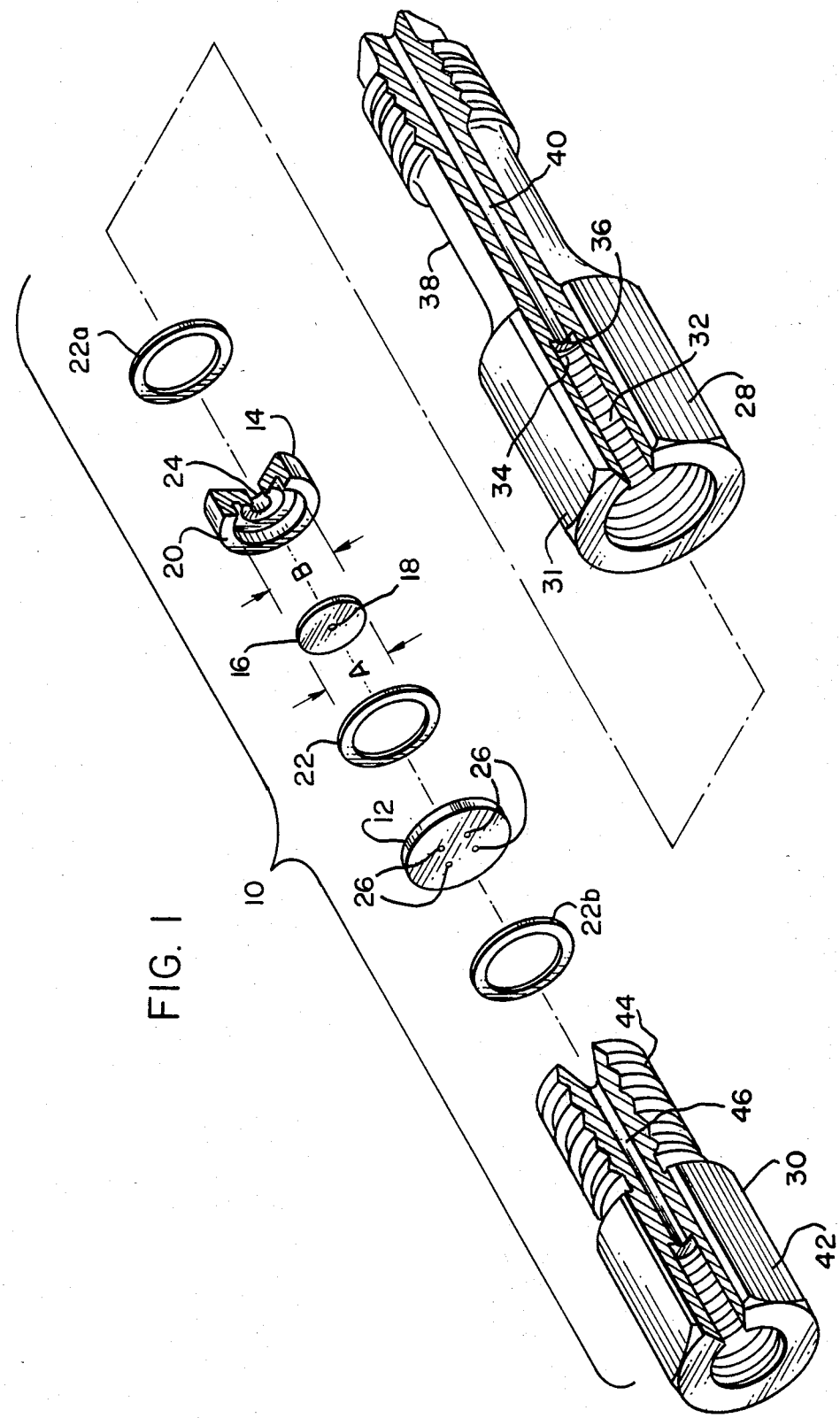
FIG. 1 is an exploded, isometric view of an embodiment of a uni-directional flow, fluid valve, according to the invention, in which portions of the valve body, valve plate and coupling are cut away for illustration purposes.
Figures 2, 2A:
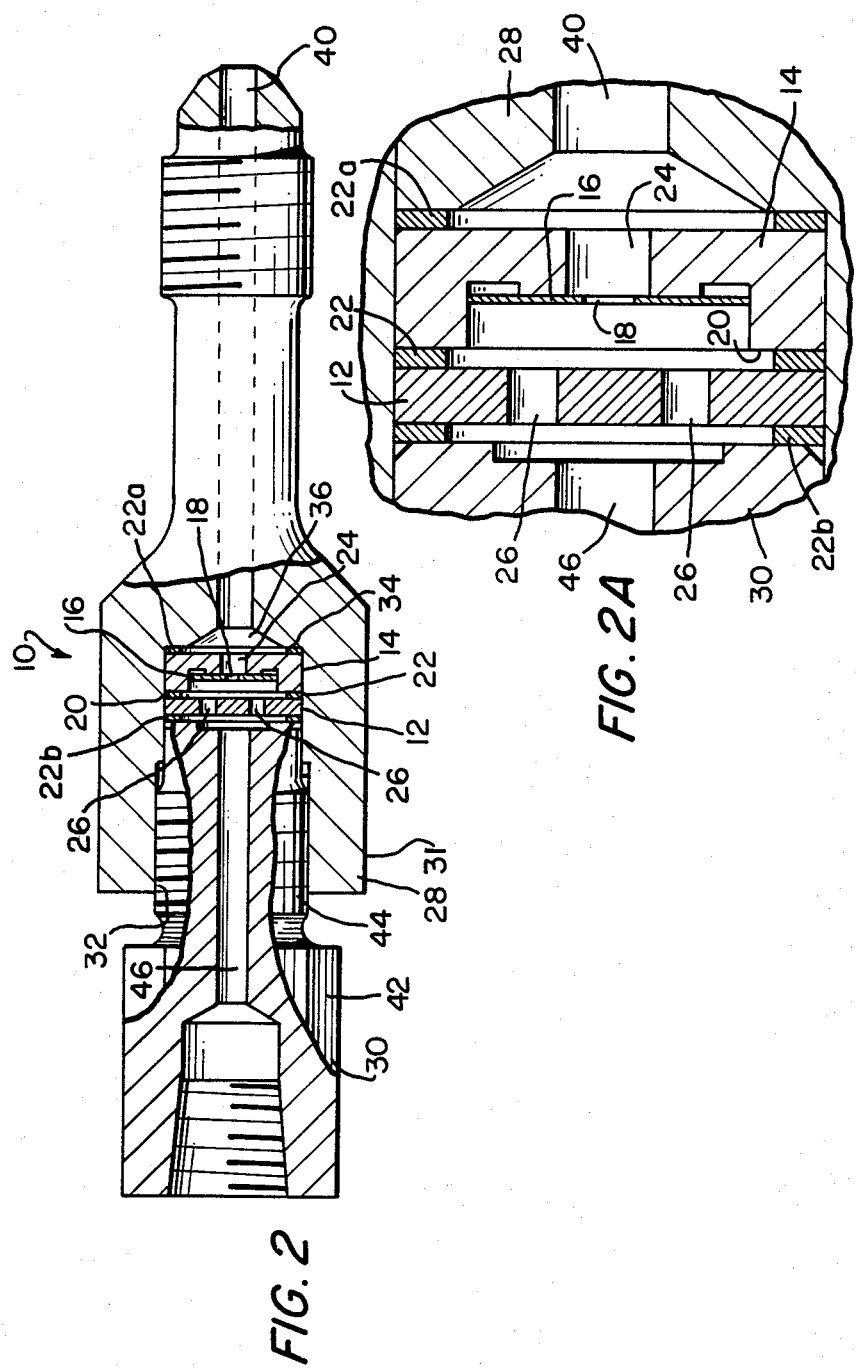
FIG. 2 is an assembled view of the FIG. 1 embodiment of the valve of the invention, the same comprising a vertical illustration thereof which is substantially cross-sectioned along the longitudinal axis thereof; most of the shank portion of the body is not cross-sectioned.

FIG. 2A, which is in a scale thrice that of FIG. 2, is a cross-sectional view of the principal valving components.

As shown in the figures, an embodiment 10 of the novel valve comprises, in its essentials, a circular valve seat 12, a valve plate 14, a valving element 16, and means for holding the seat 12 and plate 14 in a mutually confronting relationship, with the valving element 16 freely movable therebetween.

Valving element 16, a metal disc, has a fuel metering orifice 18 formed through the center thereof, and is very thin, i.e., as thin as its inertial requirement, disc stresses and the differential pressure will allow. Hence, it is lightweight, supple, and capable of excellent sealing. It has an outside diameter "A" which accommodates its free reception, and movement, axially, within the valve plate 14. Plate 14 has a circumferential or annular wall 20 having an inside diameter "B" which is approximately ten percent greater then diameter "A". Wall 20 is cooperative with seat 12 to define a shallow, cylindrical chamber within which to confine the element 16. A fluid seal 22 is interposed between the plate 14 and seat 12 to prevent radial, fluid leakage therefrom.

Plate 14, like element 16, has an orifice 24 formed through the center thereof; orifice 24, however, is larger than orifice 18. Further, seat 12 is orificed; it has a pattern of four orifices 26 formed therethrough. The four orifices 26 are equally spaced apart, radially and circumferentially, in circumscription of the center of seat 12. Accordingly, whereas orifices 18 and 24 are always in axial alignment or registry, orifice 18 (and orifice 24) is never in alignment or registry with any of the orifices 26.

The means for holding the seat 12, plate 14, and valving element 18 (with seal 22) together in operative relationship comprises a valve body 28 and a coupling 30. Body 28 has a first, externally hexagonal portion 31 which has a central bore 32. The side wall of the bore is threaded, and terminates within the body where it meets an end wall 34. A further orifice or opening 36 is formed in the center of the wall 34. The body 28 further has an elongate shank portion 38, integral therewith, with a central passage 40 formed therewithin. The latter is in open, fluid communication with orifice or opening 36 in end wall 34. Adjacent the outermost end of shank portion 38, on the outer surface thereof, is formed a thread; this is to accommodate the fitting of the valve 10 into a threaded bore or aperture therefor formed in an a pre-combustion chamber. (not shown)

Coupling 30, too, has a first, externally hexagonal portion 42 and an integral, externally-threaded portion 44. Coupling 30 is centrally bored at 46, and the portion 44 threadedly mates with portion 31 of the body 28.

On assembly, a further seal 22a is set against the end wall 34 in the body 28, and then the plate 14, valving element 16, seal 22, and seat 12 are set in place upon the seal 22a (in the order given). Next a further seal 22b is set atop the aforesaid elements, and the threaded portion 44, of coupling 30, is threaded fast in portion 31, of body 28.

As assembled, pursuant to the foregoing, the valve 10 will respond to differential fluid pressures to accommodate fluid flow therethrough from coupling 30 through the body 28, but will prevent fluid flow in the opposite direction.

Upon a greater fluid pressure obtaining in coupling 30 then obtains in body 28, the element 16 will be forced from seat 12 and will interface with the plate 14. When the relative fluid pressures are the reverse, the element 16 will be forced from plate 14 and will close upon seat 12. In the former circumstance, of course, fluid flow, as metered by orifice 18, will be accommodated through the valve 10. In the latter circumstance, fluid flow through the valve 10 is interdicted.

The invention is especially unique in that the only moving element is the thin, lightweight, metal disc 16, with the fuel metering orifice 18 in its center. In that the disc is lightweight, it provides for fast action in the presence of very low pressure differentials. The thinness of the metal disc 16 provides for positive sealing at elevated temperatures. The disc orificing causes the valve 10 to function at very low pressure differentials. The "unseating" fluid pressure is applied through the four orifices 26 over a large area of disc 16. This minimizes sticking in the check position, and insures a reliable duration of metered, fluid flow to the body 28. The "seating" fluid pressure also is applied over a large area of the disc, via the larger orifice 24, extracting the greatest advantage from a pressure differential. The axial travel of the disc 16 is minimal thereby keeping to a minimum the fluid flow necessary to transport the disc. Additionally, no springs are needed, to cause the valve 10 to function.

In use in an engine application, as noted at the outset, the valve 10 provides for more accurate metering of fuel gas to the pre-combustion chamber, and prevents hot cylinder gases from entering the fuel gas line. Consequently, the valve 10 assures quicker engine starting, more even combustion of the fuel, and less fouling of checking-element disc 16.

While I have described my invention in connection with a specific embodiment thereof, it is to be clearly understood that this is done only by way of example and not as a limitation to the scope of my invention, as set forth on the objects thereof and in the appended claims.

I claim:

1. A uni-directional flow, fluid valve, comprising:
   first means defining a circular valve seat;
   second means defining a circular valve plate;
   an annular seal; and
   third means holding said seat and said plate in a mutually confronting relationship with said seal therebetween in interfacing and sealing engagement with both said valve seat and said valve plate; wherein
   said seat and said plate have means which, with said seal, cooperatively define a cylindrical, fluid-sealed chamber therebetween; and
   a circular valving element having a given outside diameter, confined in said chamber, and freely and wholly movable between first and second spaced apart positionings therewithin; wherein
   said valving element is formed of metal, and is very thin, lightweight, and supple;
   said seat, plate and said element are orificed to accommodate fluid flow, sequentially, through one of said first and second means, through said element, and through the other of said first and second means;
   said seat, plate and said element have means cooperative (a) to prohibit such aforesaid sequential fluid flow therethrough, upon said element being in one of said first and second positionings, and (b) to permit such fluid flow therethrough, upon said element being in the other of said first and second positionings; and
   said element and a given one of said first and second means have orifices formed therein, as aforesaid, which are always in substantially common, coaxial alignment or registry, always to accommodate fluid flow therebetween; wherein
   said element comprises means responsive only to fluid pressure addressed thereto (a) through one of said first and second means, for moving said element, wholly, from one of said first and second positionings to the other thereof, and (b) through the other of said first and second means, for moving said element, wholly, from the other of said first and second positionings to said one positioning;
   the other of said first and second means has orifices formed therein, as aforesaid, which are always out of registry with any orifice in said element;
   said valve plate has a circumferential wall which, with said seal and said seat defines said fluid-sealed chamber, and has an inside diameter which is approximately ten percent greater than said given outside diameter of said valving element to accommodate said valving element nestably therewithin; and
   said orifice in said given means is (a) substantially smaller in diameter than said given outside diameter of said valving element, and (b) larger in diameter than said orifice in said element.

2. A uni-directional flow, fluid valve, according to claim 1, wherein:
   said element has only a single orifice formed therethrough;
   said single orifice comprises a fluid flow metering orifice having a diameter of a prescribed dimension;
   said element comprises a metal disc; and
   said disc has a thickness which is substantially not greater in dimension than said prescribed dimension.

3. A uni-directional flow, fluid valve, according to claim 2, wherein:
   said single orifice is formed through the radial center of said disc; and
   said valve seat has a plurality of orifices formed therethrough equally spaced apart from each other.

4. A uni-directional flow, fluid valve, according to claim 1, wherein:
   one of said first and second means has a plurality of orifices formed therethrough for addressing fluid pressure to said element through each thereof simultaneously.

5. A uni-directional flow, fluid valve, according to claim 1, further including:
   a valve body;
   said body having a cylindrical bore formed therein; wherein said seat, plate and element are slidably confined in said bore; and means removably coupled to said body for retaining said seat, plate and element within said bore.

6. A uni-directional flow, fluid valve, according to to claim 5, wherein:

said bore terminates, in said body, at a wall;

said wall has an opening formed centrally thereof;

said body has an elongate shank, integral with and projecting from said wall, which has a passage formed therethrough lengthwise and centrally thereof; and said opening is in communication with said passage.

7. A uni-directional flow, fluid valve, according to claim 6, wherein:

a portion of said shank, adjacent to an outermost end thereof, is threaded.

8. A uni-threaded flow, fluid valve, according to claim 5, wherein:

said retaining means comprises a hollow coupling;

said coupling and bore have complementary threading; and said coupling and bore are threadedly engaged.

* * * * *